US012249476B2

(12) United States Patent
Neubauer et al.

(10) Patent No.: US 12,249,476 B2
(45) **Date of Patent: *Mar. 11, 2025**

(54) BI-METALLIC ANODE FOR AMPLITUDE MODULATED MAGNETRON

(71) Applicant: Muons, Inc., Batavia, IL (US)

(72) Inventors: Michael L. Neubauer, San Francisco, CA (US); Alan J. Dudas, Alamo, CA (US); Stephen A. Kahn, Commack, NY (US)

(73) Assignee: Muons, Inc., Batavia, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/607,130

(22) Filed: Mar. 15, 2024

(65) Prior Publication Data

US 2024/0266135 A1 Aug. 8, 2024

Related U.S. Application Data

(63) Continuation of application No. 17/862,010, filed on Jul. 11, 2022, now Pat. No. 11,961,692, which is a
(Continued)

(51) Int. Cl.
*H01J 23/02* (2006.01)
*H01J 9/02* (2006.01)
*H01J 25/50* (2006.01)

(52) U.S. Cl.
CPC ................ *H01J 23/02* (2013.01); *H01J 9/02* (2013.01); *H01J 25/50* (2013.01)

(58) Field of Classification Search
None
See application file for complete search history.

(56) References Cited

U.S. PATENT DOCUMENTS 2,416,565 A * 2/1947 Beggs ........................ H03F 3/54 313/248
3,444,428 A 5/1969 Zwobada
(Continued)

FOREIGN PATENT DOCUMENTS

GB 2089109 A 6/1982
WO WO-9519039 A1 7/1995
(Continued)

OTHER PUBLICATIONS

"U.S. Appl. No. 16/752,147, Corrected Notice of Allowability mailed Mar. 17, 2022", 5 pgs.
(Continued)

*Primary Examiner* — Ashok Patel
(74) *Attorney, Agent, or Firm* — Schwegman Lundberg & Woessner, P.A.

(57) ABSTRACT

An anode structure for a magnetron provides for low eddy currents and efficient water cooling. The anode structure may be made by machining a bimetal blank including an out layer of a first metal and an inner layer of a second metal and formed by explosion bonding. The second metal has a resistivity lower than first metal and a thermal conductivity higher than the first metal. The machining may result in the anode structure with vanes each having a center (tip) portion made of the second metal and the rest made of the first metal. The machined anode structure may be coated with the second metal.

20 Claims, 7 Drawing Sheets

Related U.S. Application Data continuation of application No. 16/752,147, filed on Jan. 24, 2020, now Pat. No. 11,393,652.

(60) Provisional application No. 62/796,921, filed on Jan. 25, 2019.

(56) References Cited

U.S. PATENT DOCUMENTS

| | | | |
|---|---|---|---|
| 10,374,551 | B2 | 8/2019 | Kazakevich et al. |
| 2020/0243294 | A1 | 7/2020 | Neubauer et al. |
| 2022/0351928 | A1 | 11/2022 | Neubauer et al. |

FOREIGN PATENT DOCUMENTS

| | | | |
|---|---|---|---|
| WO | WO-2015047446 | A1 | 4/2015 |
| WO | WO-2019046327 | A1 | 3/2019 |

OTHER PUBLICATIONS

"U.S. Appl. No. 16/752,147, Ex Parte Quayle Action mailed Jan. 21, 2022", 10 pgs.

"U.S. Appl. No. 16/752,147, Notice of Allowance mailed Mar. 4, 2022", 8 pgs.

"U.S. Appl. No. 16/752,147, Response filed Feb. 15, 2022 to Ex Parte Quayle Action mailed Jan. 21, 2022", 9 pgs.

"U.S. Appl. No. 17/862,010, Non Final Office Action mailed Aug. 23, 2023", 8 pgs.

"U.S. Appl. No. 17/862,010, Notice of Allowance mailed Dec. 8, 2023", 7 pgs.

"U.S. Appl. No. 17/862,010, Response filed Nov. 6, 2023 to Non Final Office Action mailed Aug. 23, 2023", 7 pgs.

Durgutlu, A., et al., "Examination of copper/stainless steel joints formed by explosive welding", Materials & Design, 26, (2005), 497-507.

Kahn, S. A., et al., "Eddy Current Analysis for a 1.495 GHz Injection-Locked Magnetron", Proceedings of IPAC2017, Copenhagen, Denmark, (2017), 4383-4385.

Neubauer, M., et al., "Injection Locked 1497 MHZ Magnetron", 9th International Particle Accelerator Conference; IPAC2018, Vancouver, BC, Canada JACoW Publishing, (2018), 3736-3728.

Neubauer, M., et al., "Magnetron Design for Amplitude Modulation", Proceedings of IPAC2017, Copenhagen, Denmark, (2017), 4389-4391.

Wang, H., et al., "Magnetron R & D Toward the Amplitude Modulation Control for SRF Accelerator", 9th International Particle Accelerator Conference, IPAC2018, Vancouver, BC, Canada, JACoW Publishing, (2018), 3986-3989.

* cited by examiner

BI-METALLIC ANODE FOR AMPLITUDE MODULATED MAGNETRON

CLAIM OF PRIORITY

This application is a continuation of U.S. application Ser. No. 17/862,010, filed Jul. 11, 2022, which is a continuation of U.S. application Ser. No. 16/752,147, filed on Jan. 24, 2020, which claims the benefit of priority under 35 U.S.C. § 119(e) of U.S. Provisional Patent Application Ser. No. 62/796,921, filed on Jan. 25, 2019, each of which is incorporated by reference herein in its entirety.

GOVERNMENT SUPPORT

This invention was made with government support under Grant Number DE-SC0013203 awarded by the United States Department of Energy. The United States Government has certain rights in the invention.

TECHNICAL FIELD

This document relates generally to radio-frequency (RF) power generation and more particularly, but not by way of limitation, to a bi-metallic anode for an amplitude modulated magnetron.

BACKGROUND

Modern intensity-frontier superconducting pulsed accelerators need Radio Frequency (RF) sources with pulsed power up to hundreds of kilowatts at an average power of tens of kilowatts to support the phase and amplitude instability of SRF cavity accelerating fields to much less than 1 degree and 1%, respectively. Compensations for harmful effects of microphonics, Lorentz Force Detuning (LFD), and beam loading are provided by dynamic phase and power control to support accelerating field stability at the required level. Successful implementation of such control requires sufficiently wide bandwidth of the RF transmitter.

The traditional RF sources such as klystrons, Inductive Output Tubes (IOTs), and solid-state amplifiers are expensive, and their cost represents a significant fraction of the accelerator project cost. Usage of megawatt (MW)-scale klystrons feeding groups of cavities allows some cost reduction, but modulators for MW-scale klystrons are quite expensive. Moreover, this choice only provides control of the vector sum of the accelerating voltage for a group of cavities, which may be insufficient to minimize longitudinal beam emittance. Therefore, RF sources that are dynamically controlled in phase and power around the carrier frequency, feeding each SRF cavity individually, and operating without high-voltage modulators are preferable for high intensity pulsed accelerators in large-scale projects.

Magnetrons are more efficient and less expensive than the above-mentioned traditional RF sources. Utilization of magnetron RF sources in large-scale accelerator projects can significantly reduce the cost of an RF power generation system. Amplitude modulation of a magnetron can be used to compensate for microphonics in super conducting cavities by maintaining a constant gradient. Such amplitude modulation can be accomplished by varying the axial magnetic field that changes the current to the anode and hence the output power of an injection locked magnetron.

SUMMARY

An anode structure for a magnetron provides for low eddy currents and efficient water cooling. The anode structure may be made by machining a bimetal blank including an out layer of a first metal and an inner layer of a second metal and formed by explosion bonding. The second metal has a resistivity lower than first metal and a thermal conductivity higher than the first metal. The machining may result in the anode structure with vanes each having a center (tip) portion made of the second metal and the rest made of the first metal. The machined anode structure may be coated with the second metal.

In one embodiment, an apparatus for operating as an anode in a magnetron having a cathode may include a substantially cylindrical hollow block and a coating. The substantially cylindrical hollow block may include a cylindrical wall and a plurality of vanes. The cylindrical wall has an exterior surface and an interior surface and is made of a first metal having a first resistivity. The plurality of vanes may extend inwardly from the interior surface of the cylindrical wall and define a central cavity to accommodate the cathode and a plurality of sectorial cavities around and connected to the central cavity. The sectorial cavities are each formed between two adjacent vanes of the plurality of vanes. The vanes may each have a tip surface facing and defining the central cavity, a base portion connected to the interior surface of the cylindrical wall, the base portion made of the first metal, and a center portion connected between the base portion and the tip surface and including a cooling water channel configured to allow for flowing of a cooling fluid to cool the anode The center portion may be made of a second metal having a second resistivity that is lower than the first resistivity. The coating may include a coating of the second metal applied to a substantial portion of the substantially cylindrical hollow block. The substantially cylindrical hollow block may be machined from a single bi-metallic blank formed by placing a second tube made of the second metal inside a first tube made of the first metal and welding the second tube to the first tube by explosion bonding.

In one embodiment, a method for making an anode of a magnetron having a cathode is provided. The method may include producing a substantially cylindrical bi-metallic blank, machining the substantially cylindrical bi-metallic blank into a substantially cylindrical hollow block, and coating a substantial portion of the substantially cylindrical hollow block. Producing the substantially cylindrical bi-metallic blank may include providing a first tube made of a first metal having a first resistivity, providing a second tube made of a second metal having a second resistivity that is lower than the first resistivity, placing the second tube inside the first tube, and welding the second tube to the first tube by explosion bonding. The substantially cylindrical hollow block may include a cylindrical wall and a plurality of vanes. The cylindrical wall has an exterior surface and an interior surface, and may include only the first metal. The plurality of vanes may extend inwardly from the interior surface of the cylindrical wall and define a central cavity to accommodate the cathode and a plurality of sectorial cavities around and connected to the central cavity. The sectorial cavities are each formed between two adjacent vanes of the plurality of vanes. The vanes each have a tip surface, a base portion, and a center portion. The tip surface faces and defines the central cavity. The base portion is connected to the interior surface of the cylindrical wall and may include only the first metal. The center portion is connected between the base portion and the tip surface and may include a cooling water channel configured to allow for flowing of a cooling fluid to cool the anode. The center portion may include only the second metal. Coating the substantial portion of the substantially cylindrical hollow block may include coating with the second metal.

This summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized, and that structural, logical and electrical changes may be made without departing from the spirit and scope of the present invention.

This document discusses, among other things, an anode structure for a magnetron and a method for producing the anode structure. The anode structure is to be used in an injection locked magnetron with amplitude modulation. To provide the amplitude modulation, the magnetic field of the magnetron is dynamically adjusted to control the amount of current that passes from the filament to the anode of the magnetron. The magnetron includes two electromagnets: a "main coil" for controlling the operating point and a "trim coil" for controlling the amplitude modulation. The trim coil is used to modulate the output amplitude of the magnetron oscillator by adjusting the anode current. The time varying current in the trim coil induces eddy currents in the anode structure of the magnetron, which reduces the effectiveness of using the trim coil to control the amplitude modulation, for example as discussed in S. Kahn et al., "Eddy Current Analysis for a 1,495 GHz Injection-locked Magnetron", *Proc. IPAC'*17, Copenhagen, Denmark, May 2017, Paper THPIK121, pp. 4383-4385. Thus, there is a need for an anode design that minimizes the magnitude of the eddy currents.

Figure 1:
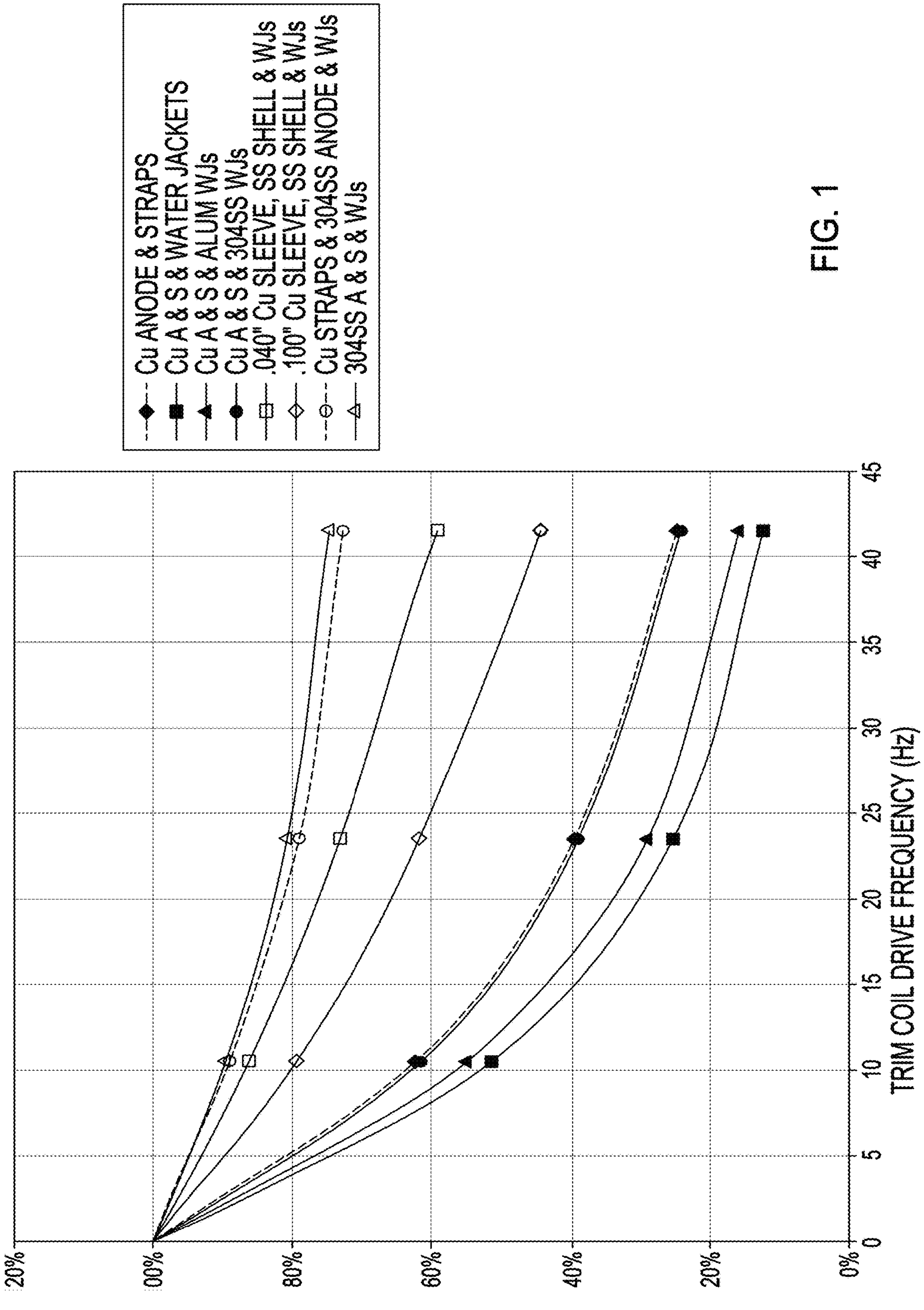
FIG. 1 is a graph showing an example of effect of eddy current on a trim coil magnetic field as function of a trim coil drive frequency and material make-up of an anode structure in a magnetron.

FIG. 1 is a graph showing an example of effect of eddy current on a trim coil magnetic field as function of a trim coil drive frequency and material make-up of the anode structure in a magnetron. The horizontal axis represents the frequency of the trim coil modulation simulated at the peaks in the vibration frequency spectrum. The vertical axis represents the percentage of trim coil magnetic field that is seen in the interaction region with respect to the DC values of trim coil axial magnetic field. Resistivity of the material of the anode shows a significant impact on the amplitude of the eddy currents. The bottom curve in FIG. 1 corresponds to the anode structure designed using all copper components (vanes, straps, and body). The top curve in FIG. 1 corresponds to the anode structure designed using all stainless steel components. The curves in between show the slow migration from all copper components to all stainless steel components.

Another design consideration is cooling of the anode, particularly the vane tip region, during operation of the magnetron. The efficiency of cooling depends on the heat transfer property of the anode material. For example, copper provides more efficient water cooling than stainless steel because of its higher heat transfer coefficient.

What is needed is an anode structure that is suitable for use in a magnetron for an RF source that can modulate its power level output according to an input control signal at a rate (modulating frequency) of 0 to 200 Hz. The suitability requires low eddy current amplitude and high cooling efficiency.

The present subject matter provides for an anode structure for an injection locked magnetron design. Examples of such magnetrons are discussed in U.S. Pat. No. 10,374,551, entitled "SUBCRITICAL-VOLTAGE MAGNETRON RF POWER SOURCE", and U.S. Pat. No. 10,374,551, entitled "PULSED POWER GENERATION USING MAGNETRON RF SOURCE WITH INTERNAL MODULATION", both assigned to Muons, Inc., which are herein incorporated by reference in their entireties. The amplitude modulation can be controlled by varying the high-voltage (HV) and the axial magnetic field with a control signal having a frequency between 0 to 200 Hz. This requires the ability to modulate the magnetic field by approximately ±5%. In one example, the direct-current (DC) magnetic field is approximately 2,500 G. The magnetic field modulation is supplied via a trim coil capable of producing the required ±5% variation.

This acoustic level variation of the magnetic field presents a problem when introduced in a magnetron fabricated in a conventional manner utilizing an all copper anode. The low resistivity of copper, while providing for small ohmic losses to the RF fields in the anode structure, allows for eddy currents to be formed easily within the toroidal anode structure. Eddy currents are created by the changing magnetic flux coupling the structure introduced to rapidly vary the magnetic field. The eddy currents are such as to counter act the magnetic field being applied, thus significantly reducing its effectiveness. The graph in FIG. 1 shows how the resultant axial magnetic field ($B_z$), created by the trim coil, is reduced based on the material of the anode structure and the drive frequency of the trim coil.

Because the eddy currents are more easily formed in a material with lower resistivity, the resistivity of the anode material and hence the amplitude of the eddy currents can be increased to reduce the deleterious effects on the modulated magnetic field. Stainless steel can be a good choice as the anode material because it is both structurally compatible and is commonly utilized in vacuum braze assemblies. However, the higher resistivity property that makes stainless steel attractive for reducing the eddy currents also makes it very lossy for the RF resonance in the anode cavities. In addition, the stainless steel has a much lower heat transfer coefficient, making it difficult to cool. A high-power magnetron requires water cooling of its anode due to ohmic losses even when it is fabricated entirely of copper, so the cooling of the anode structure needs to be addressed when stainless steel is used.

The present subject matter uses a stainless-steel anode with a thin layer of copper on the inner surface to reduce or minimize the ohmic losses, and a thick layer or some other bulky form of copper in regions where maximum heat transfer is desired for efficient cooling. Because the anode region with the most ohmic (and beam strike) generated losses (heat) is the tip of each vane, it is desirable to have a portion of the vane including the tip fabricated entirely of copper and in some way directly connected to a portion of the water-cooling system, thus reducing the effect of the poor stainless-steel heat transfer properties (at least when compared to copper). This can be done by fabricating an anode with an inner portion (where the vane tips are located) of solid copper, and the remainder of the anode (especially the outer wall where the eddy currents can flow) of stainless steel.

However, because the cooling water must flow through the outer stainless-steel portion of the anode and through the region where the copper portion of the anode connects to the stainless steel portion of the anode, and then circulate through the copper vane tips, the connection between the stainless steel and the copper must be water tight, as a water leak here would ruin the vacuum of the magnetron and thus destroy the magnetron. Joining the stainless steel and copper using braze-joints with large surface area tends to have gaps where the two metals are not bonded. These can lead to failures and virtual leaks.

Figure 2B:
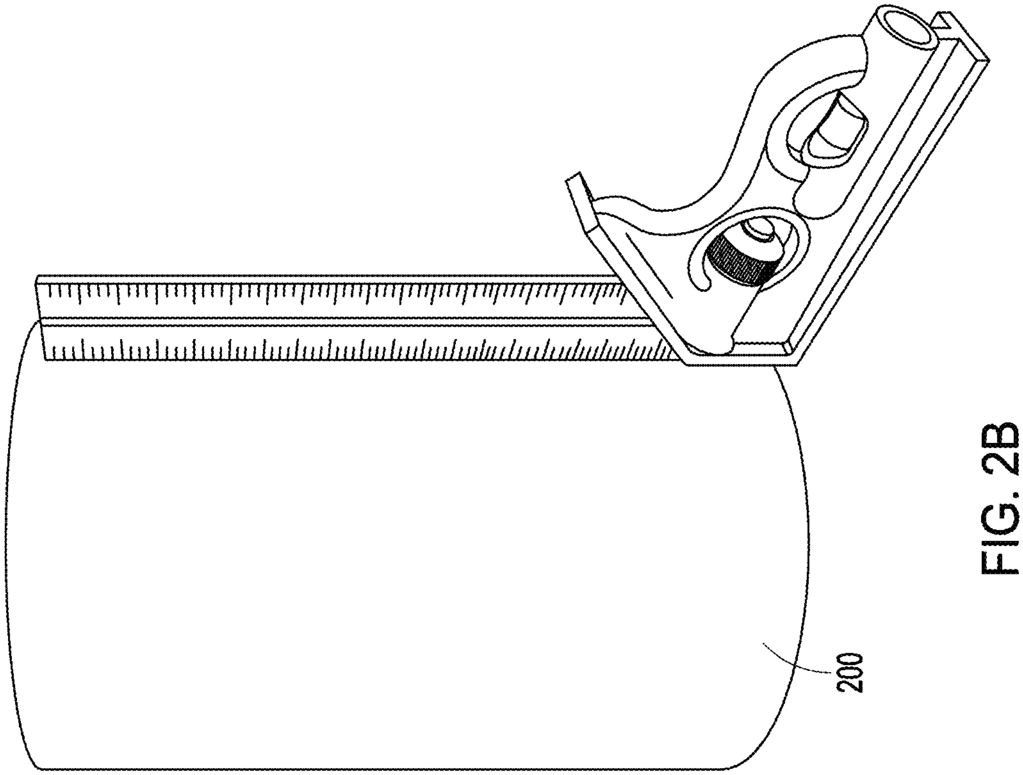
FIG. 2B is a photograph showing a side-view of the embodiment of the explosion bonded bi-metallic blank of FIG. 2A.
Figure 2A:
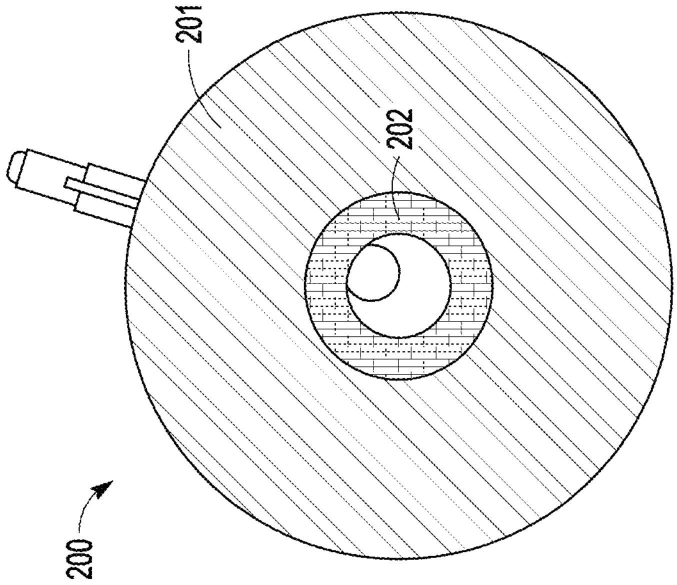
FIG. 2A is a photograph showing a top-view of an embodiment of an explosion bonded bi-metallic blank for producing an anode structure of a magnetron.

FIG. 2A is a photograph showing a top-view of an embodiment of an explosion bonded bi-metallic blank 200 for producing an anode structure of a magnetron. FIG. 2B is a photograph showing a side-view of bi-metallic bland 200.

The present subject matter uses explosion bonding (also known as explosion welding and explosion cladding) to securely bond dissimilar metals via an explosive wave front resulting from a controlled detonation of an explosive. The explosive wave front accelerates one metal into another to cause portions of the two metals to fuse together. In the illustrated embodiment, bi-metallic blank 200 includes a central copper portion 202 surrounded by a stainless-steel portion 201. From bi-metallic blank 200, the copper-stainless anode such as described above can be machined.

While there are limitations with the thickness of the materials and the bond diameter, it has been demonstrated that the copper and stainless-steel blank can be produced in such a way that once bonded, the copper has the necessary thickness to allow a complete water-cooling channel to be placed parallel to the face (tip surface) of the vane (where most of the heat loss will be generated). This also provides for the water-cooling channel to pass through the bonded regions of the structure perpendicular to the plane of the bond, thus reducing the possibility of a water leak.

Figure 3:
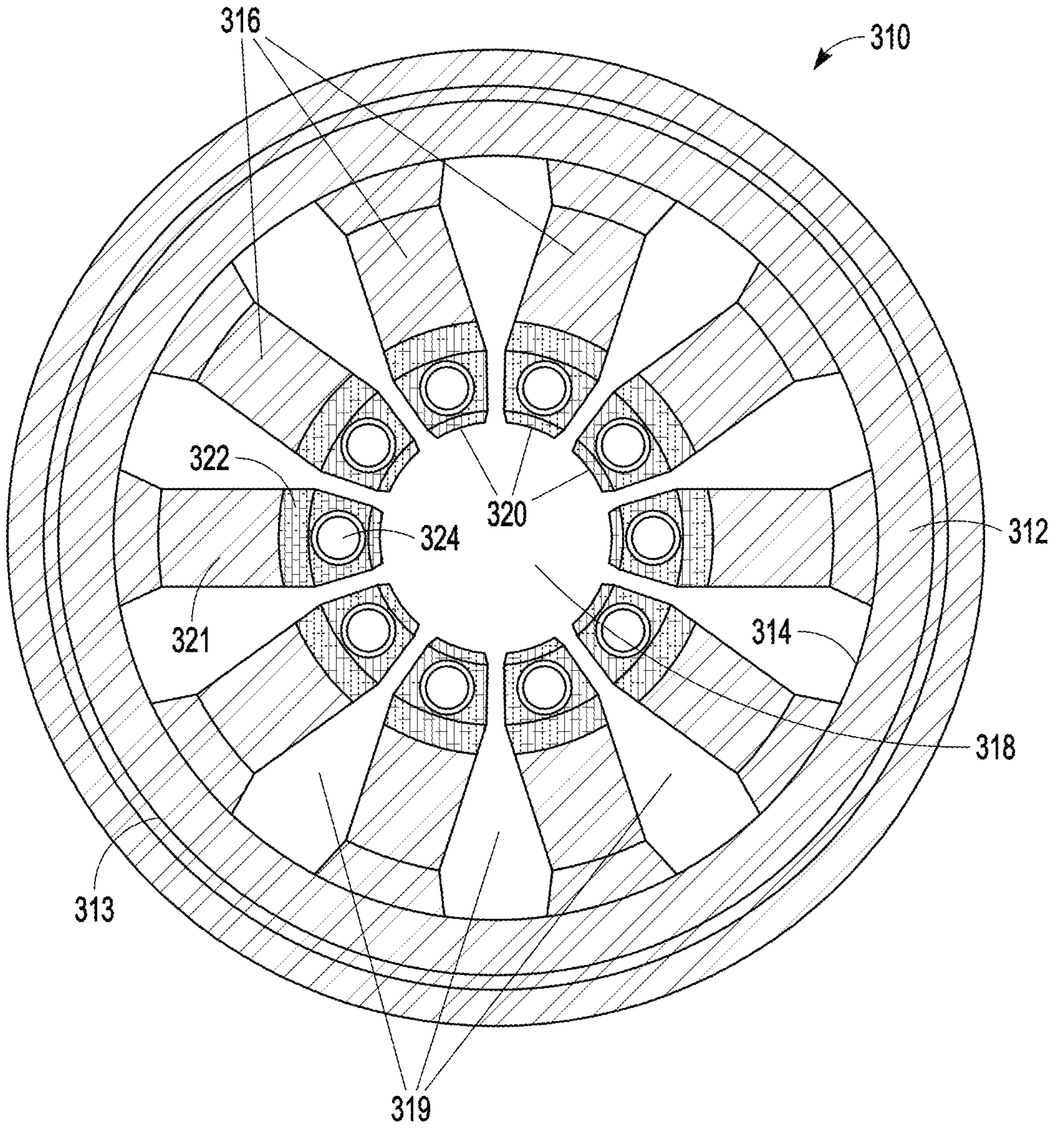
FIG. 3 is a top-view illustration of an embodiment of the anode structure machined from a bi-metallic blank such as the blank of FIG. 2

FIG. 3 is a top-view illustration of an embodiment of an anode structure 310 machined from a bi-metallic blank, such as bi-metallic blank 200. Anode structure 310 can be used as an anode in a magnetron (e.g., an injection locked magnetron as discussed above) that also includes a cathode.

In the illustrated embodiment, anode structure 310 is a substantially cylindrical hollow block including a cylindrical wall 312 and a plurality of vanes 316. In this document, unless noted otherwise, "substantially" and "approximately" each refer to a range corresponding to an engineering tolerance (e.g., permissible limits in variation of a dimension of a component specified for manufacturing). Cylindrical wall 312 has an exterior surface 313 and an interior surface 314. In various embodiments, cylindrical wall 312 is made of a first metal. An example of the first metal includes stainless steel (e.g., 304, 304N, 304LN, 316, 316L, or 316LN stainless steel). Vanes 316 extend inwardly from interior surface 314 and define a central cavity 318 and a plurality of sectorial cavities 319 around and connected to central cavity 318. Central cavity 318 can accommodate a cathode of the magnetron. The cathode can be placed co-axially with anode structure 310. Vanes 316 can include 6 to 10 vanes, with 10 vanes (as illustrated in FIG. 3) being a specific example. Vanes 316 can be substantially evenly distributed. Sectorial cavities 319 are each formed between two adjacent vanes of vanes 316.

In the illustrated embodiment, vanes 316 each have a tip surface 320 (also referred to as the "face" of the vane) facing and defining central cavity 318, a base portion 321 connected to interior surface 314, and a center portion 322 connected between base portion 321 and tip surface 320. Center portion 322 includes a cooling water channel 324 to allow for flowing of a cooling fluid to cool anode structure 310. In various embodiments, base portion 321 is made of the first metal, and center portion 322 and tip surface 320 are made of a second metal. The second metal has a resistivity that is substantially lower than the resistivity of the first metal. An example of the second metal includes copper (e.g., oxygen-free high thermal conductivity, or OFHC, copper). Center portion 322 has a thickness (the distance between tip surface 320 and a boundary between base portion 321 and center portion 322) between 3 and 5 mm, with approximately 4 mm being a specific example.

Cylindrical wall 312 and vanes 316 can be machined from a single bi-metallic blank formed by placing a tube made of the second metal inside a tube made of the first metal and explosion bonding the second tube to the first tube. An example of such a bi-metallic blank includes bi-metallic blank 200.

Figure 4:
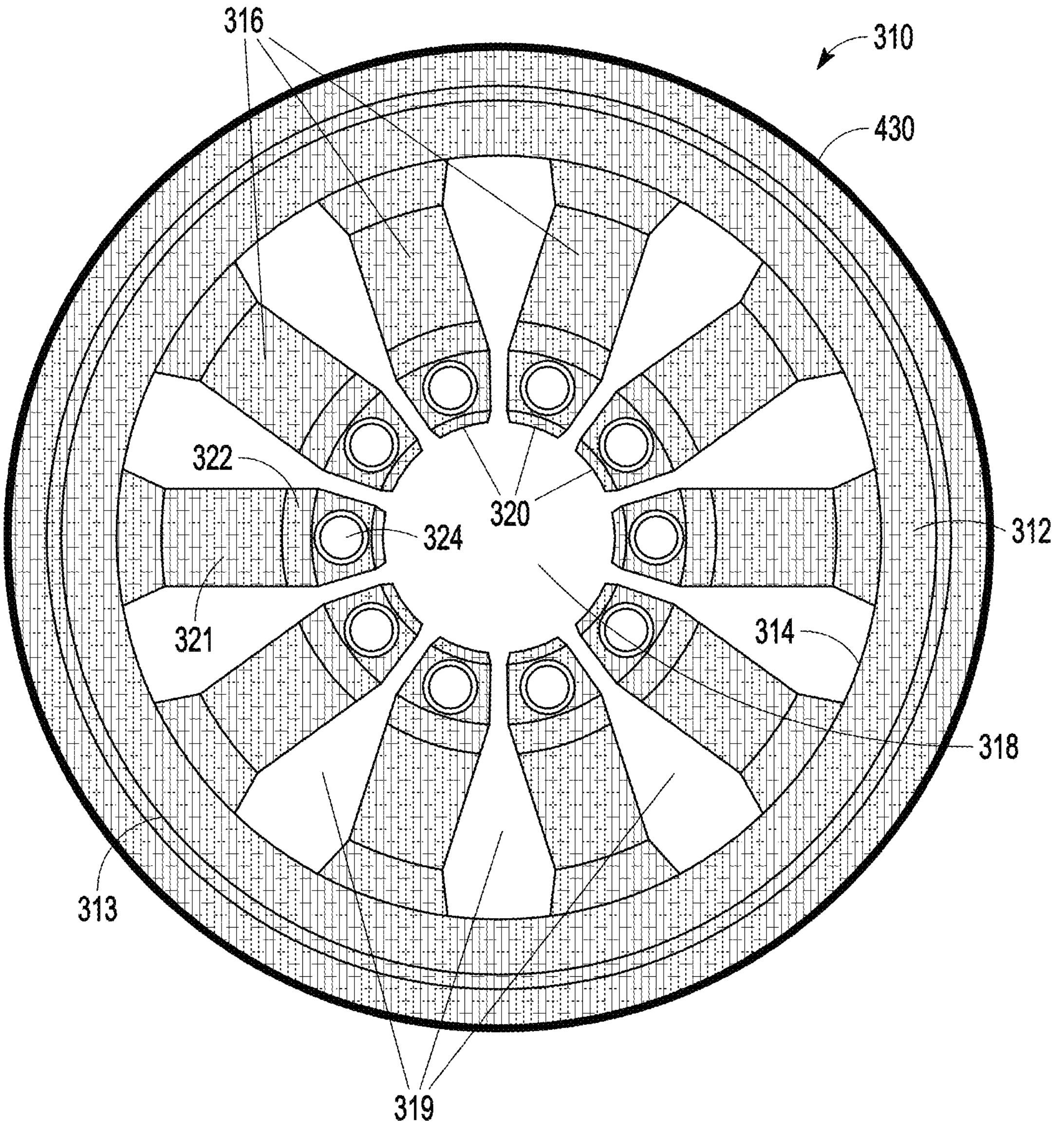
FIG. 4 is a top-view illustration of an embodiment of the anode structure of FIG. 3 with low-resistivity coating.

FIG. 4 is a top-view illustration of an embodiment of anode structure 310 with a low-resistivity coating. After anode structure 310 has been machined from the bi-metallic blank such as bi-metallic blank 200, several braze assembly steps are performed to attach other components of the resonant and cooling structure of the anode. Once all brazing operations involving the anode are completed, the anode can be copper plated to a thickness of between) 0.1 and 0.2 mm, with approximately 0.127 mm (5 mil) as a specific example. This coating places several skin depths of copper over the stainless-steel portions of the assembly, so as to eliminate the higher ohmic losses of the resonant structure due to the stainless steel. Proper masking of the anode assembly is to be performed prior to the copper coating. Once the anode assembly is copper coated, it can be assembled with other sub-assemblies of the magnetron into a complete microwave tube.

Figure 5:
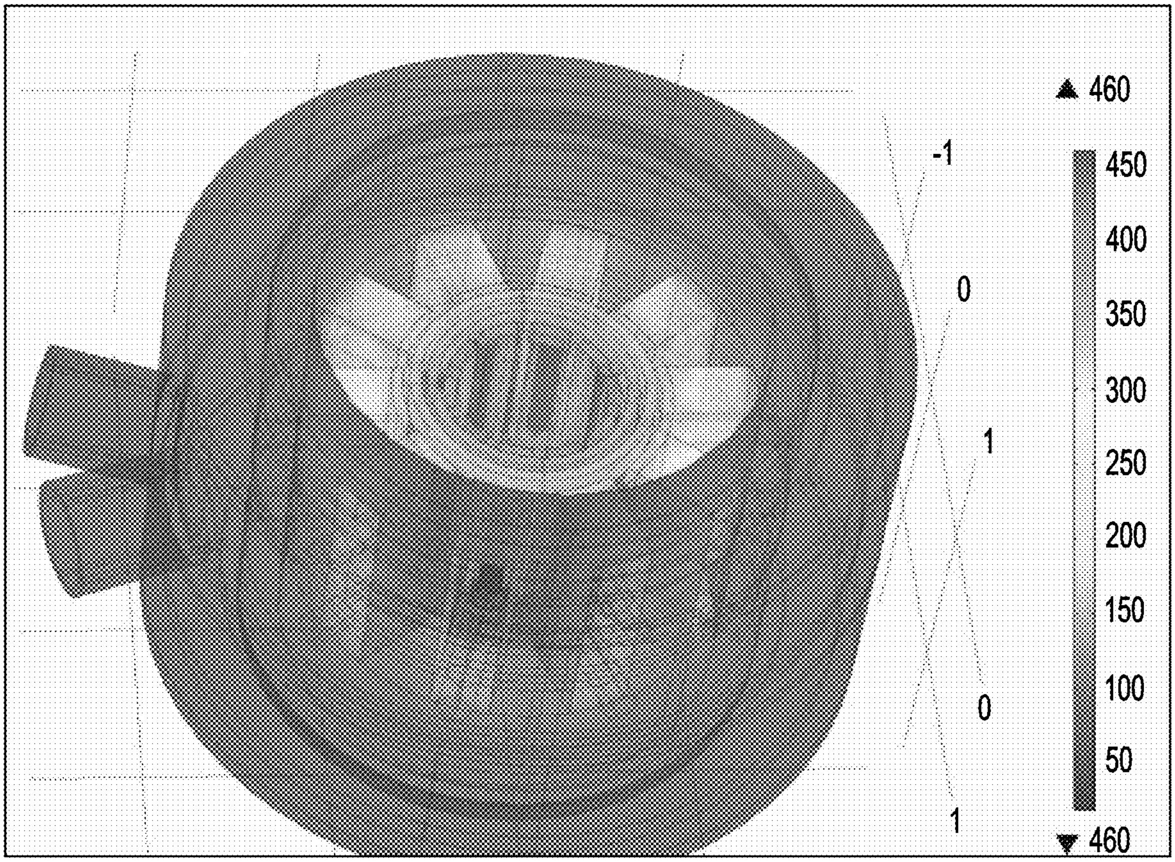
FIG. 5 is a graph showing result of an example of a simulation of temperature distribution in the anode structure of FIG. 3 with water jackets and water flow.

FIG. 5 is a graph showing result of an example of a simulation of temperature distribution in anode structure 310 with water jackets and water flow. The graph shows the gradual increase of temperature towards the vane tips while the temperature can be controlled to ensure operation of the magnetron. The goal is to keep center portion 322 below a certain temperature (e.g., specified between 250-300° C.).

Figure 6:
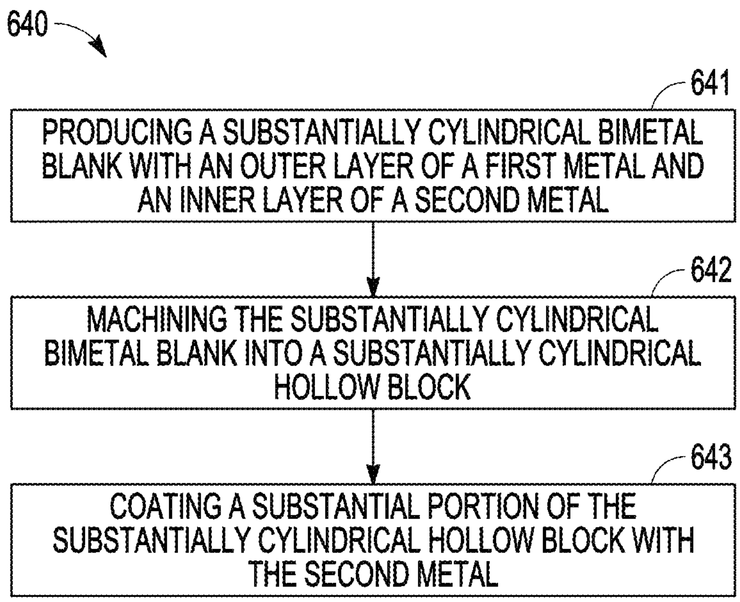
FIG. 6 is a flow chart illustrating an embodiment of a method for producing an anode structure of a magnetron using a bi-metallic blank.

FIG. 6 is a flow chart illustrating an embodiment of a method 640 for producing an anode structure in a magnetron using a bi-metallic blank. In one embodiment, method 640 can be performed to produce anode structure 310.

At 641, a substantially cylindrical bi-metallic blank is produced. The bi-metallic blank includes an outer layer of a first metal and an inner layer of a second metal.

At 642, the substantially cylindrical bi-metallic blank is machined into a substantially cylindrical hollow block. The cylindrical hollow block includes a cylindrical wall and a plurality of vanes. The cylindrical wall has an exterior surface and an interior surface, and includes only the first metal. The vanes extend inwardly from the interior surface of the cylindrical wall and define a central cavity to accommodate a cathode of the magnetron and a plurality of sectorial cavities around and connected to the central cavity. The sectorial cavities are each formed between two adjacent vanes of the plurality of vanes. The vanes each has a tip surface facing and defining the central cavity, a base portion connected to the interior surface of the cylindrical wall and including only the first metal, and a center portion connected between the base portion and the tip surface and including a cooling water channel configured to allow for flowing of a cooling fluid to cool the anode. The center portion includes only the second metal. An example of the cylindrical hollow block includes anode structure 310.

At 643, the internal dimension of the cylindrical hollow block is coated with the second metal.

Figure 7:
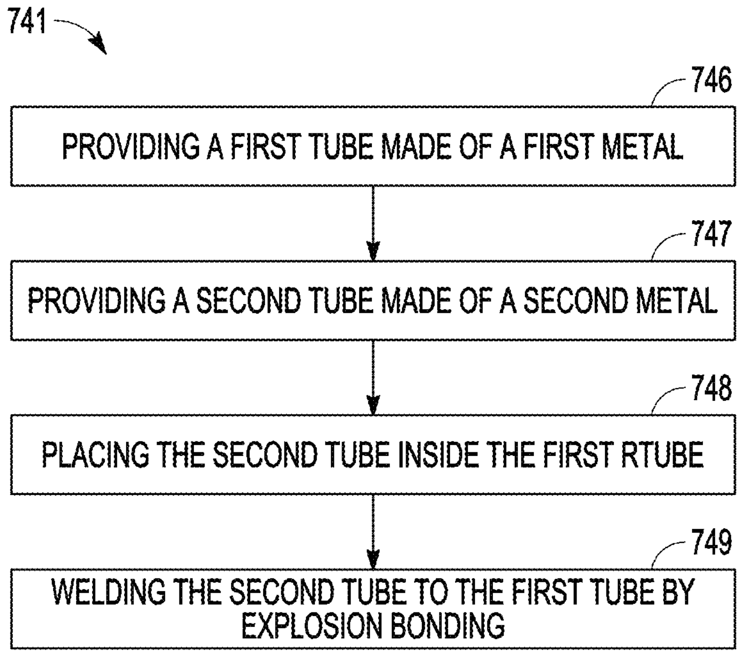
FIG. 7 is a flow chart illustrating an embodiment of a method for providing the bi-metallic blank of FIG. 6.

FIG. 7 is a flow chart illustrating an embodiment of a method 741 for providing the bi-metallic blank used in method 640. Method 741 can represent an example of method 641.

At 746, a first tube made of a first metal is provided. At 747, a second tube made of a second metal is provided. At 748, the second tube is placed inside the first tube. At 749, the second tube is welded to the first tube by explosion bonding.

In various embodiments, the first metal in methods 640 and 741 has a higher resistance than the second metal in methods 640 and 741. Example of the first metal in methods 640 and 741 includes stainless steel. Example of the second metal in methods 640 and 741 includes copper. In one embodiment, the first metal in methods 640 and 741 includes stainless steel, and the second metal in methods 640 and 741 includes copper.

Figure 8:
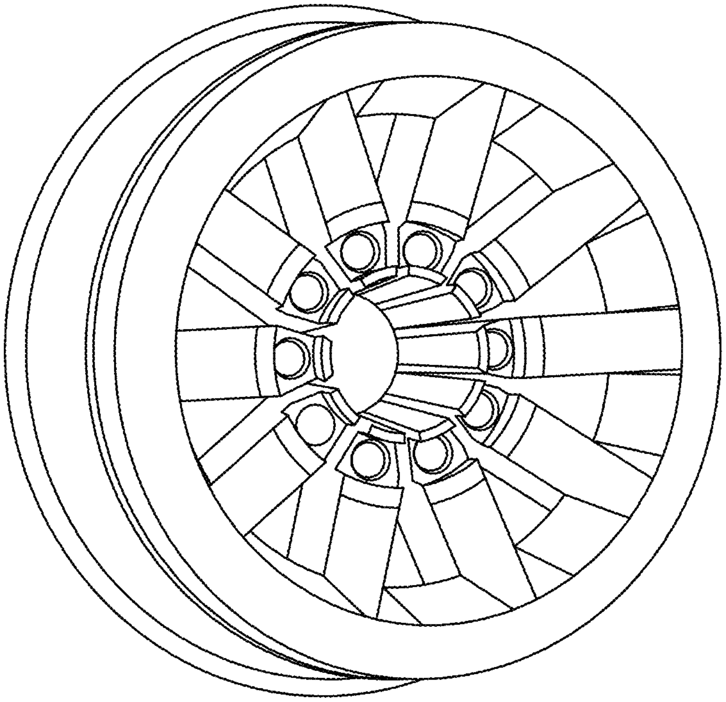
FIG. 8 is a perspective view of an example of an implemented anode structure of FIG. 3.
Figure 9:
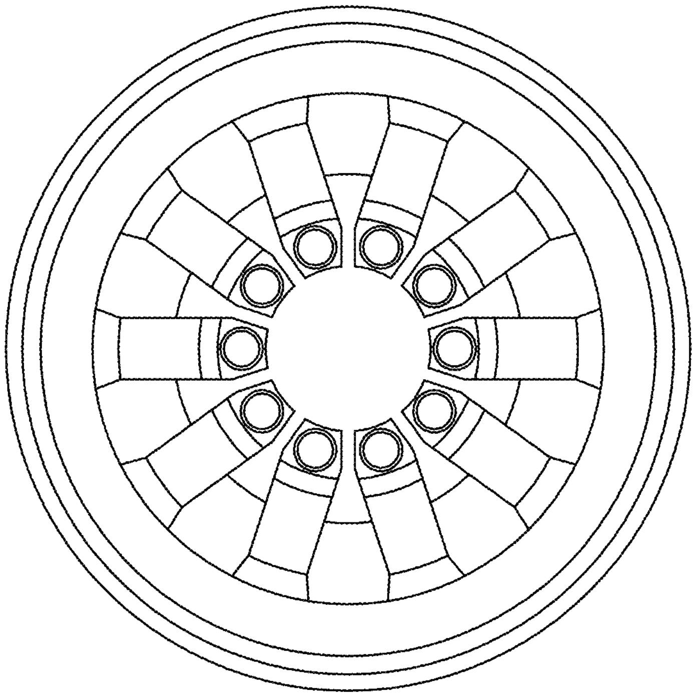
FIG. 9 is a top view of the anode structure of FIG. 8.

FIG. 8 is a perspective view of an example of an implemented anode structure 310. FIG. 9 is a top view of the implemented anode structure 310. In this example, the first metal is stainless steel, and the second metal is copper.

It is to be understood that the above detailed description is intended to be illustrative, and not restrictive. Other embodiments will be apparent to those of skill in the art upon reading and understanding the above description.

What is claimed is:

1. An apparatus for operating as an anode in a magnetron having a cathode, the apparatus comprising:
- a cylindrical wall made of a first metal; and
- vanes extending inwardly from the cylindrical wall and configured to define a cavity to accommodate the cathode, the vanes each including a base portion made of the first metal and connected to the cylindrical wall and a center portion made of a second metal and connected to the base portion.

2. The apparatus of claim 1, wherein the first metal has a first resistivity, and the second metal has a second resistivity that is lower than the first resistivity.

3. The apparatus of claim 1, wherein the first metal has a first thermal conductivity, and the second metal has a second thermal conductivity that is higher than the first thermal conductivity.

4. The apparatus of claim 1, wherein the cylindrical wall and the vanes are formed by machining a single bi-metallic blank formed by:
- placing a second tube made of the second metal inside a first tube made of the first metal; and
- welding the second tube to the first tube by explosion bonding.

5. The apparatus of claim 4, further comprising a coating of the second metal over the cylindrical wall and the vanes.

6. The apparatus of claim 1, wherein the vanes comprise 6 to 10 vanes.

7. The apparatus of claim 6, wherein the vanes are evenly distributed.

8. The apparatus of claim 7, wherein the vanes comprise 10 vanes.

9. The apparatus of claim 1, wherein the first metal comprises stainless steel.

10. The apparatus of claim 1, wherein the second metal comprises copper.

11. An apparatus for operating as an anode in a magnetron having a cathode, the anode to be cooled using a cooling fluid, the apparatus comprising:
- a cylindrical wall; and
- vanes extending inwardly from the cylindrical wall and configured to define a cavity to accommodate the cathode,
- wherein the cylindrical wall and the vanes are formed by machining a single bi-metallic blank including an outer tube of a first metal and an inner tube of a second metal, the inner tube placed in and bonded to the outer tube.

12. The apparatus of claim 11, wherein the bi-metallic blank is formed by placing the inner tube inside the outer tube and welding the inner tube to the outer tube.

13. The apparatus of claim 12, wherein the bi-metallic blank is formed by welding the inner tube to the outer tube by explosion bonding.

14. The apparatus of claim 11, wherein the cylindrical wall is formed from the outer tube of the bi-metallic blank, and the vanes each comprise:
- a base portion extending from the cylindrical wall and formed from the outer tube of the bi-metallic blank; and
- a center portion extending from the base portion and formed from the inner tube of the bi-metallic blank.

15. The apparatus of claim 14, further comprising a coating of the second metal over the cylindrical wall and the vanes.

16. The apparatus of claim 14, wherein the first metal has a first electrical resistivity and a first thermal conductivity, the second metal has a second electrical resistivity and a second thermal conductivity, the first electrical resistivity is higher than the second electrical resistivity, and the first thermal conductivity is lower than the second thermal conductivity.

17. The apparatus of claim 16, wherein the first metal comprises stainless steel.

18. The apparatus of claim 16, wherein the second metal comprises copper.

19. The apparatus of claim 11, wherein the cavity comprises a central cavity to accommodate the cathode and sectorial cavities each between two adjacent vanes of the vanes and connected to the central cavity, and the center portions of the vanes each comprise a cooling water channel configured to allow for flowing of the cooling fluid.

20. The apparatus of claim 19, wherein the vanes comprises 6 to 10 evenly distributed vanes.

* * * * *